(12) United States Patent
Berolo et al.

(10) Patent No.: US 6,753,958 B2
(45) Date of Patent: Jun. 22, 2004

(54) RESOLUTION ENHANCED OPTICAL SPECTROMETER HAVING A FIXED NUMBER OF PHOTODETECTOR ELEMENTS

(75) Inventors: Orazio Berolo, Ottawa (CA); Jian-Jun He, Ottawa (CA); Emil S. Koteles, Ottawa (CA); Bryant Hichwa, Santa Rosa, CA (US); John Wade, Orleans (CA)

(73) Assignee: MetroPhotonics Inc., Ottawa (CA)

( * ) Notice: Subject to any disclaimer, the term of this patent is extended or adjusted under 35 U.S.C. 154(b) by 18 days.

(21) Appl. No.: 10/102,833

(22) Filed: Mar. 22, 2002

(65) Prior Publication Data

US 2002/0176171 A1 Nov. 28, 2002

Related U.S. Application Data

(60) Provisional application No. 60/277,629, filed on Mar. 22, 2001.

(51) Int. Cl.[7] .................................................. G01J 3/28
(52) U.S. Cl. ............................ 356/328; 385/37; 398/87
(58) Field of Search ................................. 356/326, 328; 398/84, 87; 385/37, 14

(56) References Cited

U.S. PATENT DOCUMENTS 4,875,773 A  * 10/1989 Burns et al. ................. 356/328
6,618,129 B2 *  9/2003 Dries et al. .................... 356/73
2002/0081062 A1 *  6/2002 He .............................. 385/24

* cited by examiner

Primary Examiner—F. L. Evans
(74) Attorney, Agent, or Firm—Clifford H. Kraft

(57) ABSTRACT

A waveguide optical monitor is disclosed. The device has an optical input port coupled through a switch to a plurality of input waveguides. A dispersive element disperses light within the input optical waveguides toward a plurality of output waveguides. There are a plurality of photodetectors each optically coupled to an output waveguide. The photodectors are for sensing an intensity of light within the waveguide with which it is optically coupled. An optical switch in optical communication with the optical input port and for switching light received at the optical input port to one of the plurality of input waveguides. Also, an angular dispersive element is present for receiving light from any one of the waveguides and for dispersing the light toward a plurality of output waveguides in dependence upon the input waveguide position and a wavelength of the light such that light directed from the first of the plurality of input waveguides toward the plurality of output waveguides has a first centre wavelength within each of the output waveguides and light directed from the second of the plurality of input waveguides toward the plurality of output waveguides has a second different centre wavelength within each of the output waveguides, the second different centre wavelength different form any first centre wavelength.

19 Claims, 10 Drawing Sheets

RESOLUTION ENHANCED OPTICAL SPECTROMETER HAVING A FIXED NUMBER OF PHOTODETECTOR ELEMENTS

This application claims benefit from U.S. Provisional Application No. 60/277,629 filed Mar. 22, 2001.

FIELD OF THE INVENTION

The invention generally relates to integrated optical spectrometers and more specifically to an optical spectrometer with enhanced resolution.

BACKGROUND OF THE INVENTION

Optical spectrometers are devices that separate an optical signal into a plurality of component optical signals based on a wavelength of each component. Thus, a spectrometric device allows for accurate measurement of light within separate wavelength ranges or channels. The measurement of this light allows for determinations to be made about the light being analysed.

It is well known to photograph a spectrum produced by passing light through a gaseous sample in order to classify the sample. In high school chemistry text books, readers are shown pictures of spectra from different chemical samples. Similarly, spectra of burning chemicals are also useful in classifying a chemical composition of the products and reactants.

In more recent times, computers and photodetectors have replaced the old film, camera, and human vision approach to spectroscopy. Currently, a state of the art spectrometer disperses a received light signal onto a surface of a photodetector array. By dispersing the light along a linear path, a linear array is supported. Each detector in the array detects light incident thereon and provides a signal based on the intensity of incident light to a computer system for analysis. The computer then filters the signals to remove noise and processes the spectrum to determine information relating thereto. Spectrometers have gained widespread acceptance in science and are, at present, sufficiently precise and accurate.

Unfortunately, these spectrometers described above are large and costly. As such, they are not well suited to in situ applications or to installation within fibre optic networks.

There are two main approaches to reducing costs and size of spectrometers. In a first approach, fewer photo detectors are employed resulting in lower resolution of the spectrometer. Such an approach with a fixed photodetector array has been avoided by scientists unless the spectral region of interest is very small because it reduces the resolution—quality—of the resulting information. It has been proposed to move the photodetectors, a mirror within the optical path of the dispersed light, or the dispersive element itself to increase the resolution of the spectrometer. However because these devices have moving parts they are costly, difficult to manufacture, require re-calibration at frequent intervals and, as such, are not preferable for use in optical networks.

In the second approach, smaller optical components are used resulting in insufficient dispersion of light incident on the photo detectors. The resolution of the spectrometer is limited by the spacing of the photo detectors in the array. As such, very small photodetector arrays having small detector elements are necessary. This is problematic since smaller detectors are typically more costly and less sensitive.

In fibre optics, spectrometers are used to monitor channelised optical signals. Such a spectrometer is generally referred to as a monitor. For integrated monitors, if information other than light intensity is required—several photodetectors are located within the dispersed light of a single channel. Thus, a four channel optical monitor requires at least 12 photo detectors. Since current photodetectors are supplied in strips of up to 128 photodetectors, this allows monitoring of just over 40 channels. Of course, smaller photodetector arrays are far less costly and, as such, would be preferred. For this reason, most available monitors operate on 4, 8, or 16 channels. Alternatively, monitors only monitor signal intensity thereby requiring only one detector per channel. It would be advantageous to provide a spectrometer capable of monitoring more information than merely intensity data of light without requiring complex and costly photo detector arrays and the additional equipment required to interpret the output of a complex photodetector array.

Prior art optical spectrometers utilising scanning gratings with moving parts allow for an increase in the information measurable by the device. There is, however, a need for an optical spectrometer having no moving parts and a capacity for broadband operation with selectable information measurable for light within channels within an input optical signal.

SUMMARY OF THE INVENTION

In accordance with the invention there is provided a waveguide optical monitor comprising:
  a plurality of dispersive element input ports;
  a plurality of photodetectors for sensing an intensity of light incident thereon;
  a dispersive element for receiving light from any one of the dispersive element input ports and for dispersing the light toward the plurality of photodetectors in dependence upon a position of said dispersive element input port and a wavelength of the light such that light directed from a first of the plurality of dispersive element input ports toward the plurality photodetectors has associated first centre wavelengths and light directed from the second of the plurality of dispersive element input ports toward the plurality of photodetectors has associated second centre wavelengths, the second centre wavelengths each substantially different from all of the first centre wavelengths.

In accordance with the invention there is also provided a waveguide optical monitor comprising:
  an optical input port;
  a plurality of dispersive element input ports;
  an optical switch in optical communication with the optical input port and for switching light received at the optical input port to one of the plurality of dispersive element input ports;
  a plurality of photodetectors for sensing an intensity of light incident thereon;
  a dispersive element for receiving light from any one of the dispersive element input ports and for dispersing the light toward the plurality of photodetectors in dependence upon a position of said dispersive element input port and a wavelength of the light such that light directed from a first of the plurality of dispersive element input ports toward the plurality of photodetectors has associated first centre wavelengths and light directed from the second of the plurality of dispersive element input ports toward the plurality of photodetectors has associated second centre wavelengths, the second centre wavelengths forming a set different from a set formed by the first centre wavelengths.

In accordance with the invention there is also provided a method of monitoring a wavelength division multiplexed optical signal comprising the steps of:

providing an optical signal to a switch;

selecting a switch mode for selectably providing the optical signal via one of a plurality of input ports to a dispersive element;

dispersing the optical signal in dependence upon the location of the selected input port and in dependence upon a wavelength of the optical signal and directing the dispersed optical signal toward a plurality of monitoring elements, wherein selecting different switching modes results in light within a different wavelength range being incident upon a same detector.

In accordance with the invention there is also provided a thermally modulated optical channel monitor comprising:

a waveguide made of a material having a temperature dependent refractive index, the waveguide comprising a dispersive element for dispersing received light in dependence upon wavelength;

a temperature adjust element for varying the temperature of the waveguide; and, a sensor for sensing an intensity of light incident thereon forming a portion of the received light, the portion varying in dependence upon the waveguide temperature, the sensor for sensing all intensity of light at different waveguide temperatures, the different waveguide temperatures providing for sensing of a signal at different wavelengths.

In accordance with the invention there is also provided a method for monitoring an optical signal comprising the steps of:

providing a waveguide made of a material having a temperature dependent refractive index, the waveguide comprising a dispersive element for separating the optical signal into a plurality of separated optical signals based upon wavelength;

providing a temperature adjust element for varying the temperature of the waveguide;

providing the optical signal to the waveguide;

sensing an intensity of light of at least a separated optical signal at different waveguide temperatures, the intensity of light being dependent upon the waveguide temperature, the different waveguide temperatures providing for sensing of the at least a separated optical signal at different wavelengths;

sensing a parameter indicating the waveguide temperature at each instance an intensity of light was sensed; and, sampling the intensities of light of the at least a separated optical signal and the corresponding parameters indicating the waveguide temperature.

BRIEF DESCRIPTION OF THE DRAWINGS

The invention will now be described with reference to the drawings in which:

FIG. 12b is a simplified diagram illustrating the temperature dependence of the wavelength for a channel signal shown in FIG. 12a;

DETAILED DESCRIPTION OF THE INVENTION

Figure 1:
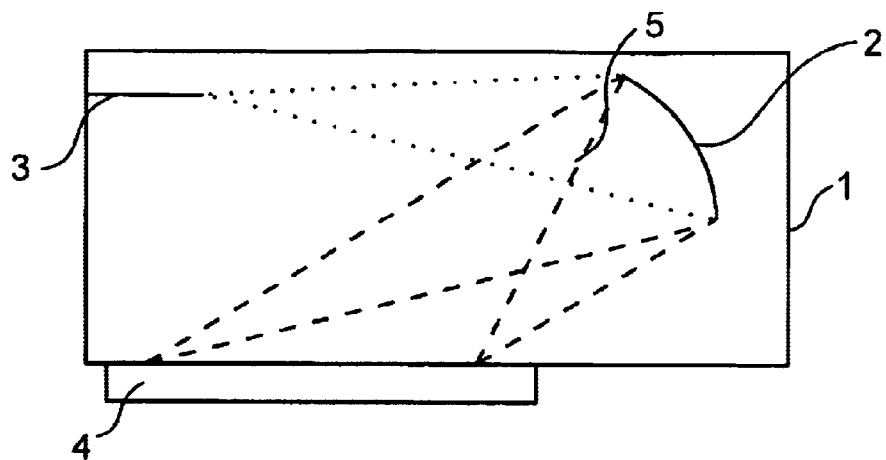
FIG. 1 is a diagram of a single input angular dispersive element optical spectrometer.

Referring to FIG. 1, a spectrometer 1 integrated within a planar waveguide is shown incorporating a waveguide grating 2. The spectrometer 1 is for dispersing light incident thereon in dependence upon a wavelength of the light. In order to accomplish this, light is provided at an input port to a waveguide 3. The waveguide 3 is coupled to a slab waveguide region for providing the received light thereto. The light expands within the two dimensional slab waveguide region 5 and is then incident on the waveguide grating 2. Though a reflective echelle grating is shown, the grating is optionally another form of grating. The grating acts to adjust a phase of the light incident thereon in order to cause light to disperse across an output port in dependence upon its wavelength such that light at a first wavelength is incident at a first predetermined location and light at a second other wavelength is incident at a second other predetermined location. A plurality of photodetectors 4 are disposed along the output port such that a photodetector at the first predetermined location is for sensing light at the first wavelength. In use, provided light propagates within the planar waveguide and interacts with the waveguide grating 2. The waveguide grating 2 receives an optical signal. The optical signal comprises individual optical signals each having a specific wavelength. The grating reflects the optical signal and causes wavelength dependant dispersion thereof. The light provided by the dispersed optical signal illuminates the plurality of photodetectors 4 and a photocurrent results. The photocurrent provided by a given photodetector is dependant upon the intensity of the light illuminating said photodetector. A spectrum, as shown in FIG. 2a, results.

Figure 2A:
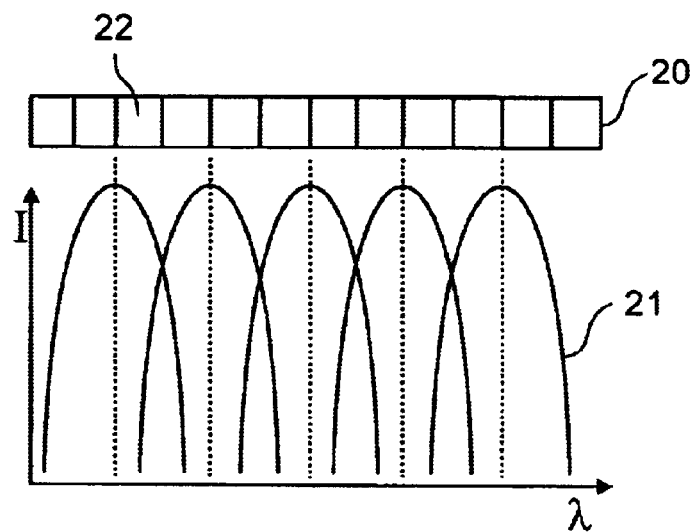
FIG. 2a is a diagram of the optical spectrum obtained from the angular dispersive element optical spectrometer with near infinite resolution.

In FIG. 2a, a graphical representation of a wavelength spectrum corresponding to provided light is shown. In this example, the light incident on each of the plurality of photodetectors is of a different wavelength. This simplifies the description of the device however it is possible to provide light signals of different wavelengths to a same photodetector. A bar 20 is shown above the spectrum indicative of detector locations for the plurality of photodetectors. Each of the boxes 22 corresponds to a sampling point within the spectrum and as a result the resolution of the spectrum is limited by the number of photodetector elements. Currently photodetector arrays having 256 photodetector elements are commercially available, though quite costly. The resolution of the measured spectrum depends upon a number of photodetectors available for sensing and their spacing within the photodetector array. The resolution also depends upon a dispersion of the light across an output endface of the integrated spectrometer.

Figure 2B:
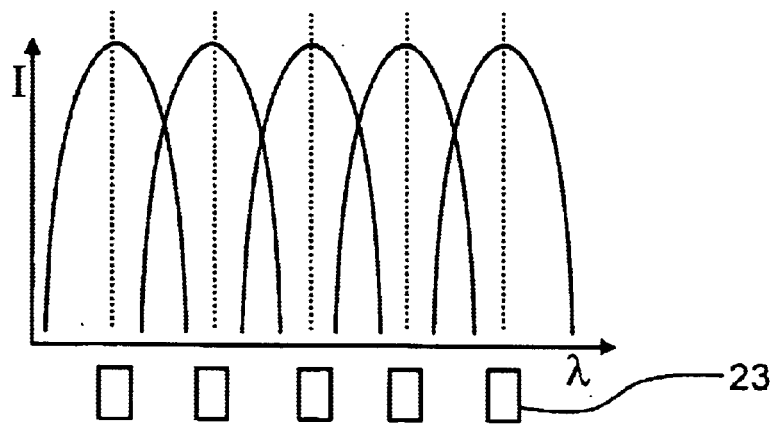
FIG. 2b is a diagram of the optical spectrum obtained for a device according to FIG. 1 with output waveguides for forming a demultiplexer device providing channelised light to the sensor array, for example using a monitor according to FIG. 3.

Referring to FIG. 2b, another graphical representation of a spectrum is shown. Here, the number of photodetectors is only 5 and, as such, using conventional spectrometers the resulting spectrometric data consists of five sample points within the spectrum.

Figure 3:
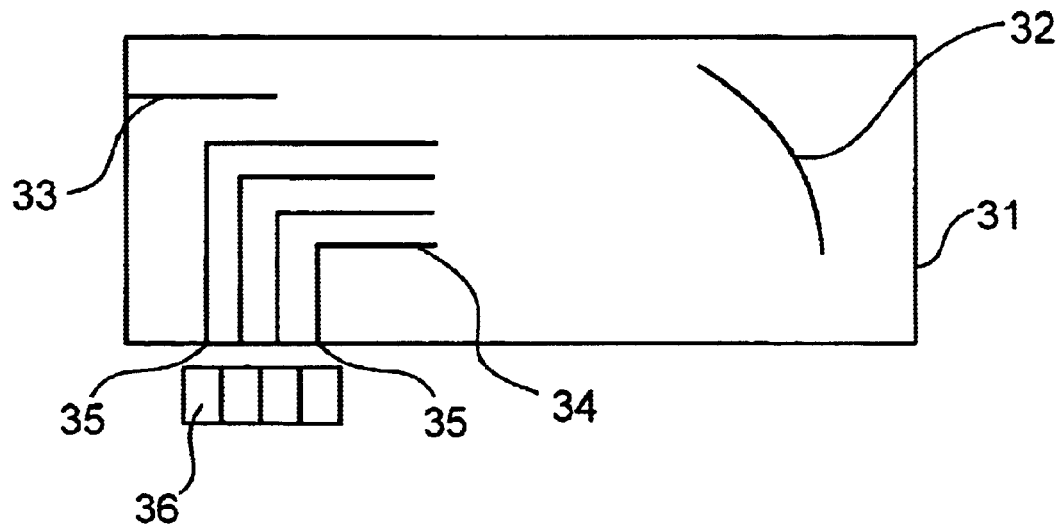
FIG. 3 is a diagram of the a demultiplexer device with an array of sensors coupled to output waveguides thereof.

Referring to FIG. 3, a prior art integrated monitor 31 is shown. This monitor demultiplexes an input optical signal propagating within an input waveguide 33 and provides the demultiplexed optical signals to each photodetector via output waveguides 34. The incoming optical signal propagates within the planar waveguide and interacts with an angular dispersive element in the form of an echelle grating 32. The angular dispersive element reflects the light and causes separation of the light signals in dependence upon their wavelength. The light signals corresponding to different wavelength channels propagate into separate output waveguides 34 optically coupled to separate output ports 35. Each output port 35 is optically coupled to a photodetector 36. The light signal within each output waveguide 34 illuminates a single photodetector 36 resulting in a photocurrent in dependence upon the light intensity of the light illuminating the photodetector 36. Thus, for each wavelength channel an intensity measurement is possible.

The output waveguides 34 are positioned relative to the angular dispersive element 32 such that each output waveguide corresponds to a wavelength channel corresponding to the supported wavelength channels of the input optical signal. Using this form of optical monitor, when appropriately designed, yields peak channel power for each channel as is shown in the spectrum of FIG. 2b. In the case of an 80 channel input optical signal, 80 photodetectors are used to obtain the peak power with one detector dedicated to each channel.

Figure 4:
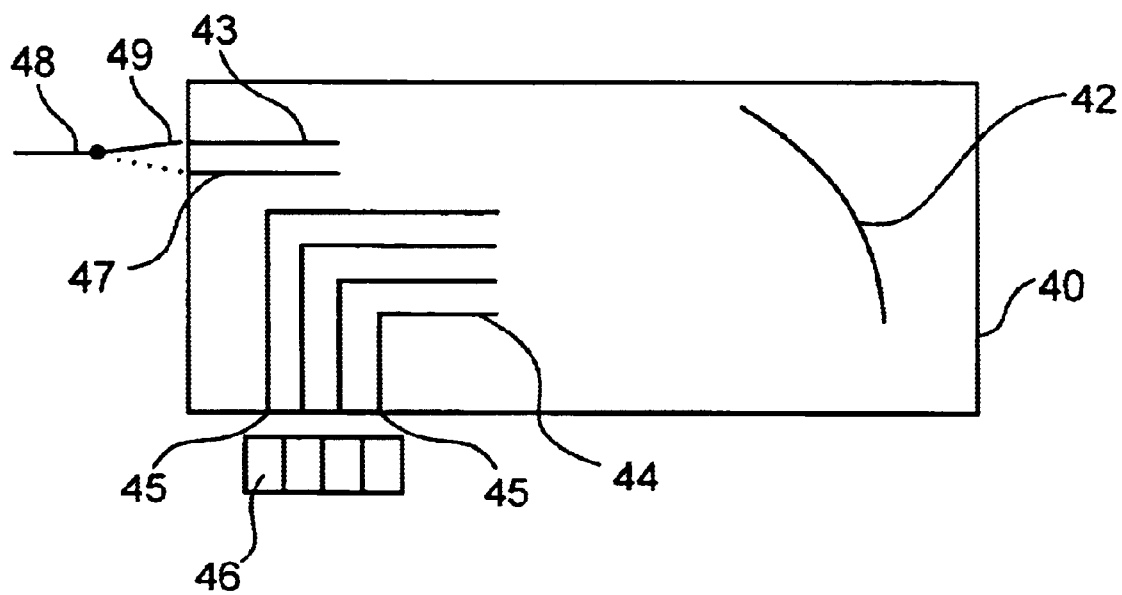
FIG. 4 is a diagram of the a dual input angular dispersive element optical monitor.

Referring to FIG. 4, a spectrometer 40 according to the invention is shown in the form of a waveguide grating demultiplexer device. The spectrometer includes a dispersive element in the form of an echelle grating 42, a plurality of output waveguides 44 and a plurality of photodetectors 46. Each output waveguide 44 is shown having an associated photodetector 46. An optical signal is provided to the spectrometer via either of two input ports. The first input port optically coupled to waveguide 43 and the second input port optically coupled to waveguide 47. This allows for variations in the dispersion of the light onto the waveguides 44 in dependence upon the selected input port. As such, a first predetermined wavelength range is incident on the waveguide 44 when light is provided at the first input waveguide 43 and a second predetermined wavelength range is incident on the waveguide 44 when light is provided at the first input waveguide 47.

A switch 49 is coupled to each of the input ports for providing light from an input waveguide 48 to either of the input waveguides 43 and 47 selectably. The light is then demultiplexed and provided to the output waveguides and the photodetectors 46 in turn. The light signal within each output waveguide illuminates a photodetector and generates a photocurrent in dependence upon the light intensity illuminating the photodetector.

Below are explained two possible configurations that use the integrated device of FIG. 4. First, an eight channel monitor is provided. Here, four wavelength channels are provided to the output waveguides 34 spaced two channel spacing apart. Thus, providing light to the input waveguide 43 results in channels 0, 2, 4, and 6 being measured simultaneously. Providing light to the input waveguide 47 results in channels 1, 3, 5, and 7 being measured simultaneously. Here, the two input waveguides 43 and 47 are disposed relative to one another such that a single channel spacing shift across the photodetectors results when an optical signal is alternately provided to each. Thus, an eight channel monitor results wherein four channels are monitorable at a time or, by constantly switching the switch 49, the eight channels are monitored in an interlaced fashion.

Figure 5A:
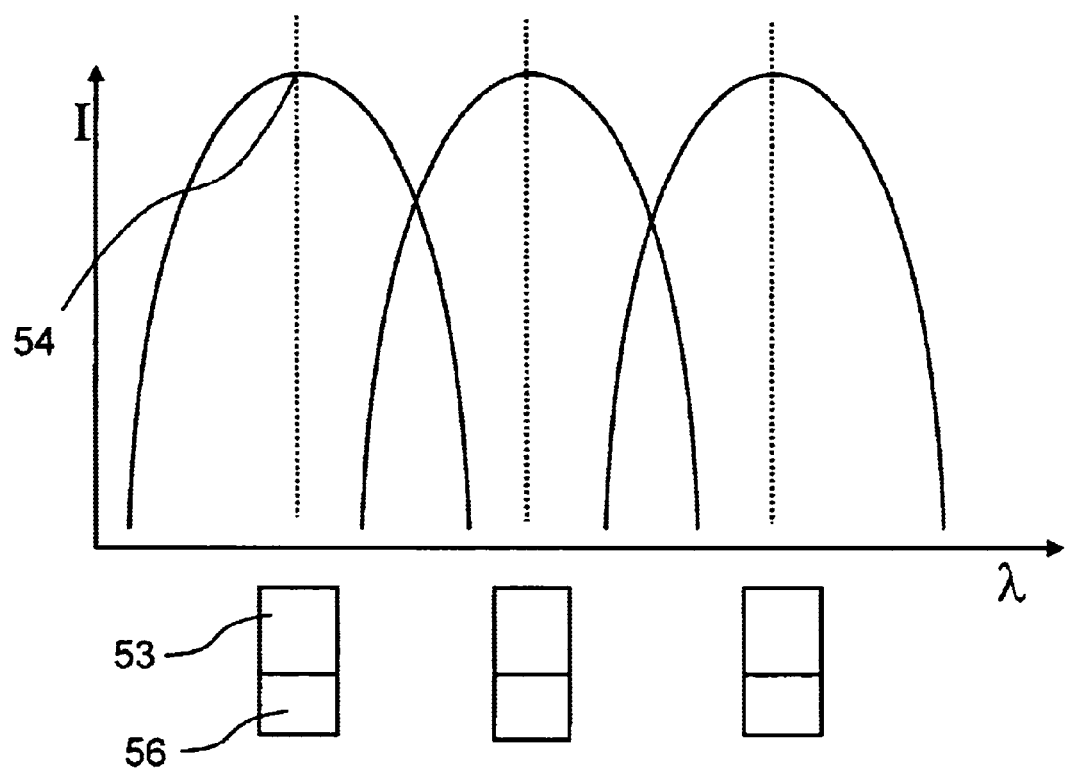
FIG. 5a is a diagram of the optical spectrum obtained by propagating an optical signal along a first input waveguide of the device of FIG. 4.

In the second example, the first input waveguide 43 is positioned relative to the angular dispersive element 42 in such a manner as to illuminate the output waveguides 44 with light within a portion of each wavelength channel. Typically, the portion is the centre of each wavelength channel within the input optical signal 48. Selecting a first position of optical switch 49 results in the optical signal propagating along the first input waveguide 43. Referring to the spectrum shown in FIG. 5a, when the optical switch 49 is in a first position the peak power from each channel 54—which is shown to correspond to the centre of the channel—illuminates a photodetector 56 via an output waveguide 53.

Figure 5B:
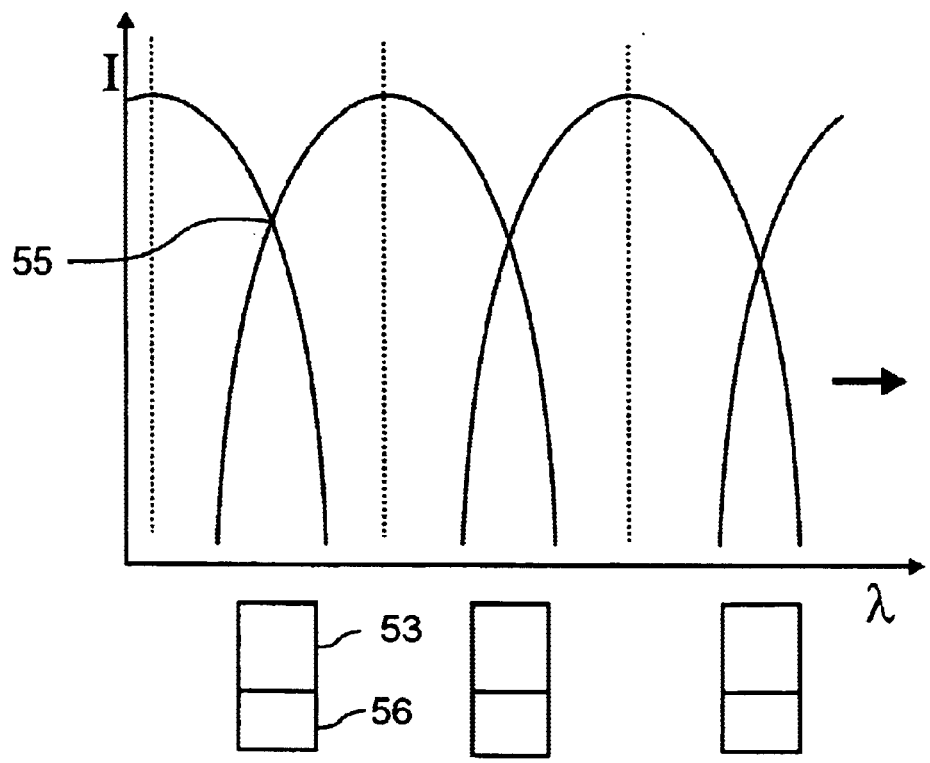
FIG. 5b is a diagram of the optical spectrum obtained by propagating an optical signal along a second input waveguide of the device of FIG. 4.

The second input waveguide 47 is oriented relative to the angular dispersive element 42 in such a manner as to illuminate the output waveguides 44 with light within another portion of each wavelength channel. Typically, this other portion corresponds to a range of wavelengths between wavelength channels within the input optical signal 48. Selecting a second position of optical switch 49 results in the optical signal propagating along the second input waveguide 47. Referring to the spectrum shown in FIG. 5b, when the optical switch 49 is in a second position the intensity of light between channels 55 illuminates the photodetector 56 via the output waveguide 53.

Figure 6:
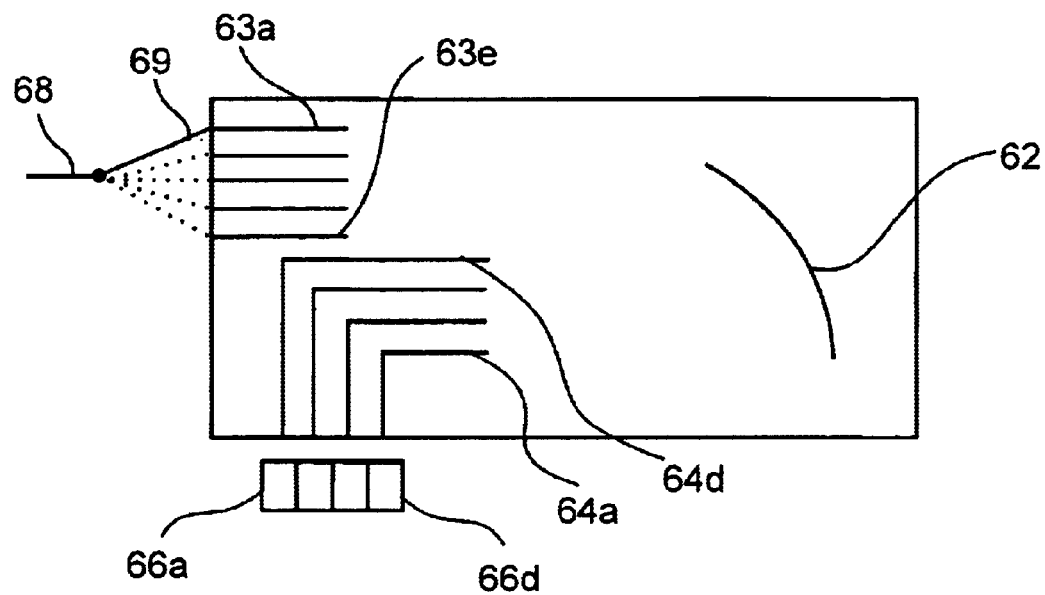
FIG. 6 is a diagram of an angular dispersive element optical monitor with output waveguides and having a plurality of input waveguides with a controllable optical switch.

Thus, for each channel, two intensity measurements are made and the channel is analysed for more than peak intensity. Of course numerous measurements are possible with an N position optical switch and N input waveguides as shown in FIG. 6 for N=5. A spectrometer in the form of a waveguide grating demultiplexer device 61 is shown. Here, demultiplexing of an input optical signal 68 is performed in dependence upon the selected input waveguide and the wavelength of the light within the optical signal. The selectable portion of the demultiplexed wavelength spectrum is provided to a plurality of photodetectors 66a to 66d via output waveguides 64a to 64d. The incoming optical signal 68 propagates in one of a plurality of input planar waveguides 63a to 63e selectable via optical switch 69 and interacts with an angular dispersive element 62. The angular dispersive element 62 reflects the light off a first surface thereof and causes separation of the light signals based upon their wavelength. The light signals corresponding to different channels propagate into separate output waveguides 64a through 64d optically coupled to separate output ports. Each output port is optically coupled to one of the corresponding photodetectors 66a to 66d. The light signal within each output waveguide illuminates the corresponding photodetector resulting in a photocurrent in dependence upon the light intensity illuminating the photodetector.

The plurality of input waveguides 63a to 63e are positioned relative to the angular dispersive element 62, wherein illumination of each of the input waveguides is controllable through the optical switch 69 having a plurality of positions. The first input waveguide 63a is oriented to the angular dispersive element 62 in such a manner as to illuminate the output waveguides 64a with a portion of light having a wavelength within each channel in the form of, for example, a central wavelength of each channel within the input optical signal 68. Selecting a first position of optical switch 69 results in the optical signal propagating along the first input waveguide 63a. The remaining input waveguides 63b . . . 63e are oriented to the angular dispersive element 62 in such a manner as to illuminate the output waveguides 64 with different portions of the input optical signal 68. Selecting an optical switch position between the first and last input waveguides results in an optical power incident on a photodetector corresponding to a different portion of the spectrum within each channel.

Thus for each of the channels N intensity values are measurable which, when N>2, allows measurement of signal to noise ratio and monitoring of other channel related parameters, for example, peak wavelength.

Figure 7:
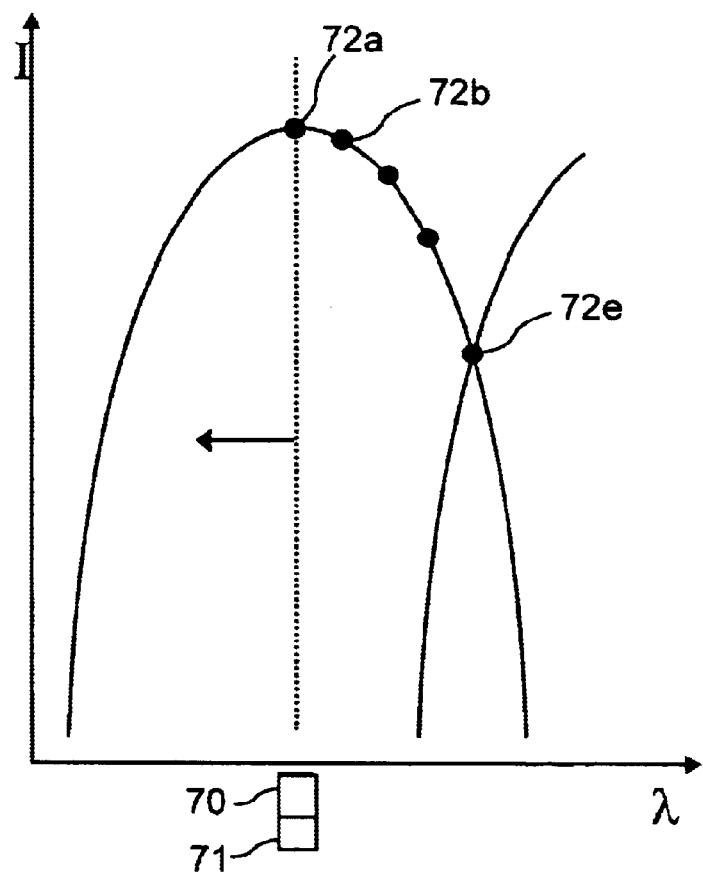
FIG. 7 is a diagram of the optical spectrum for a plurality of different input switch positions for the monitor of FIG. 6.

Referring to FIG. 7, an optical spectrum is shown for a same single photodetector 71 and coupled output waveguide 70 wherein the input waveguides are disposed for supporting monitoring of half of each wavelength channel. Selecting a first input optical switch position, results in a photocurrent read of 72a, selecting another input optical switch position, results in a photocurrent read of 72b, selecting an Nth input optical switch position, results in a photocurrent read of 72c. Of course, up to 2N optical switches would be used to read a plurality of values from valley to valley. When valley to valley sensing is desired, an (N+1)th switch position results in a reading of the spectral amplitude to the left of the peak 72a. In this manner scanning an input optical switch through a number of predetermined states results in more spectrometric data than was previously attainable using the same number of photodetector elements. This is achieved through shifting of the optical spectrum relative to the photodetectors through the use of different input waveguides.

For example the device in FIG. 4 is optionally manufactured in such a manner as to provide peak power measurements for a 100 GHz channel spacing input optical signal in a first switch position, and to provide valley power measurements for a same input signal in a second optical switch position. Changing the input channel spacing to 200 GHz, results in the device having 4 measurements per channel. Changing the input channel spacing to 50 GHz results in only peak measurements for each channel but requires fewer detectors since only every Nth peak is sensed in each switch position.

Alternatively the optical switch and photodetectors are manufactured as part of the waveguide grating demultiplexer device. Wherein the optical switch is designed to support a plurality of optical paths and the photodetectors are integrated as part of the output waveguides.

Figure 8:
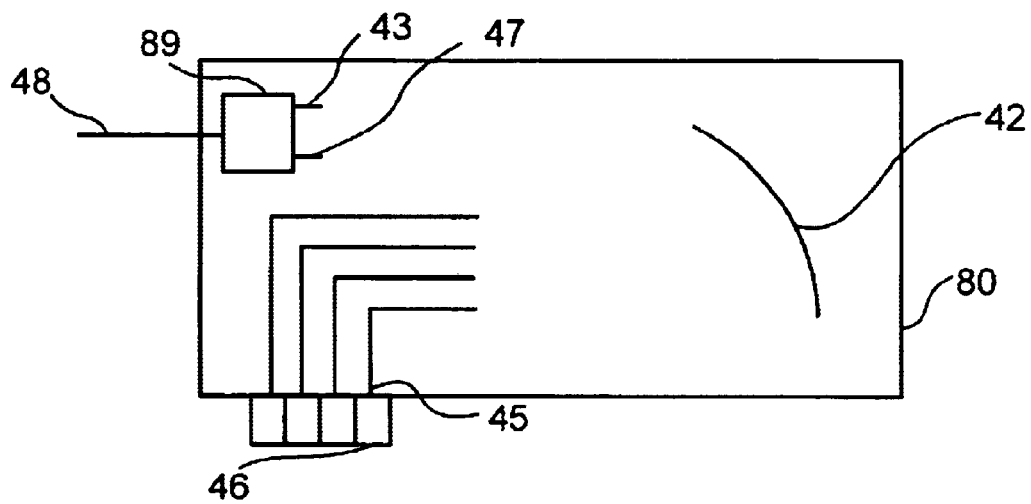
FIG. 8 is a simplified block diagram of an integrated spectrometric device having a single input waveguide.

Referring to FIG. 8, an embodiment is shown wherein a single input waveguide is provided and wherein an integrated optical switch 89 is disposed within the integrated spectrometric device 80. Here, light is provided to the spectrometer as well as is a control signal indicative of a portion of the spectrum to be sensed. The control signal is typically an electrical signal. The spectrometer receives an electrical signal indicative of a sensed intensity of light incident on each photodetector. Integration of the switch 89 allows for enhanced scalability, reduced manufacturing costs, smaller finished packaging, improved portability, and improved resilience to harsh environments.

Figure 9:
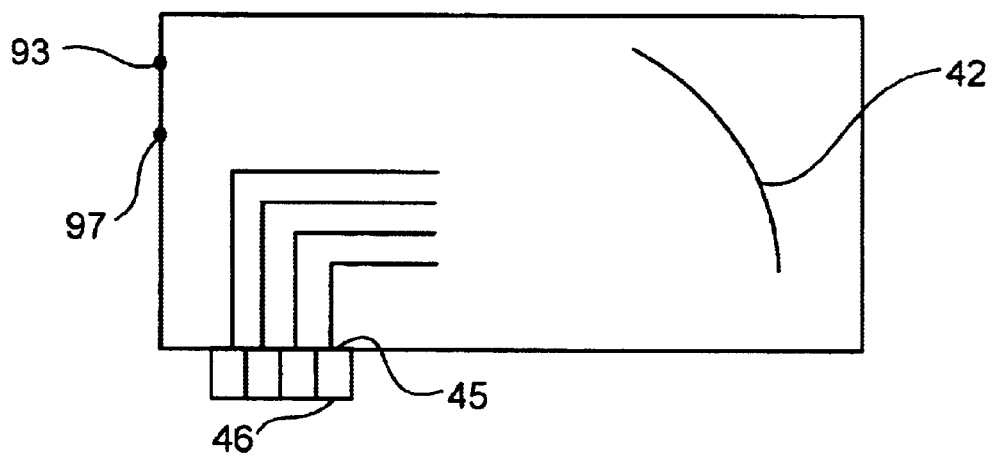
FIG. 9 is a simplified block diagram of an integrated spectrometric device having a two input ports.

Referring to FIG. 9, another embodiment is shown absent the input waveguides 43 and 49. Here, the input port 93 and 97 act to provide light at a correct angle and location for use with the invention. Such an embodiment provides for reconfigurability since any number of input ports and input locations are useful with a same spectrometer and optical switch.

Figure 10:
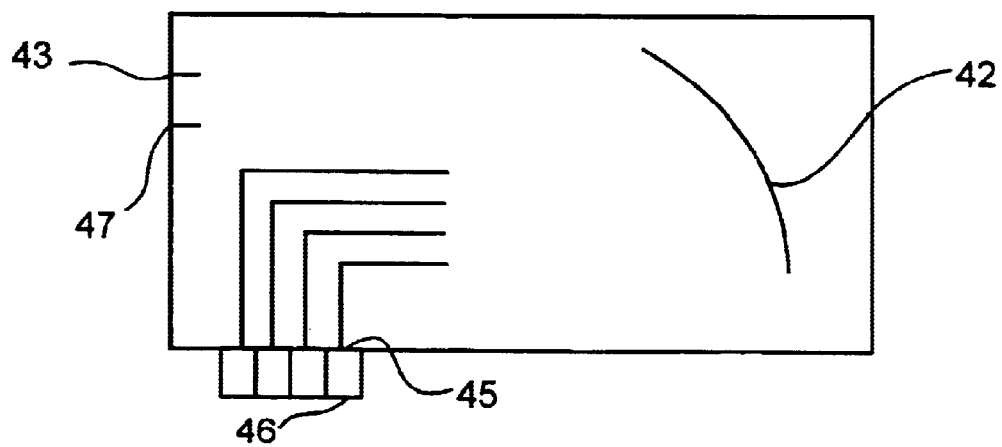
FIG. 10 is a simplified block diagram of an integrated spectrometric device having two input waveguides sufficiently spaced apart.

Referring to FIG. 10, a further embodiment of the invention is shown wherein the two input waveguides are disposed to provide sufficient spacing such that a same portion of the light within each wavelength channel is provided to the detectors, but such that different detectors receive light within different wavelength channels depending on which input waveguide light is provided through. As such, if a detector fails, the device remains operational. In fact, so long as two adjacent detectors do not fail within a same plurality of detectors, it is possible to have up to one half of the detectors fail while maintaining full operation of the monitoring device. For use in harsh environments, such an implementation will sometimes prove beneficial allowing for component failure and automated device recovery.

Figure 11:
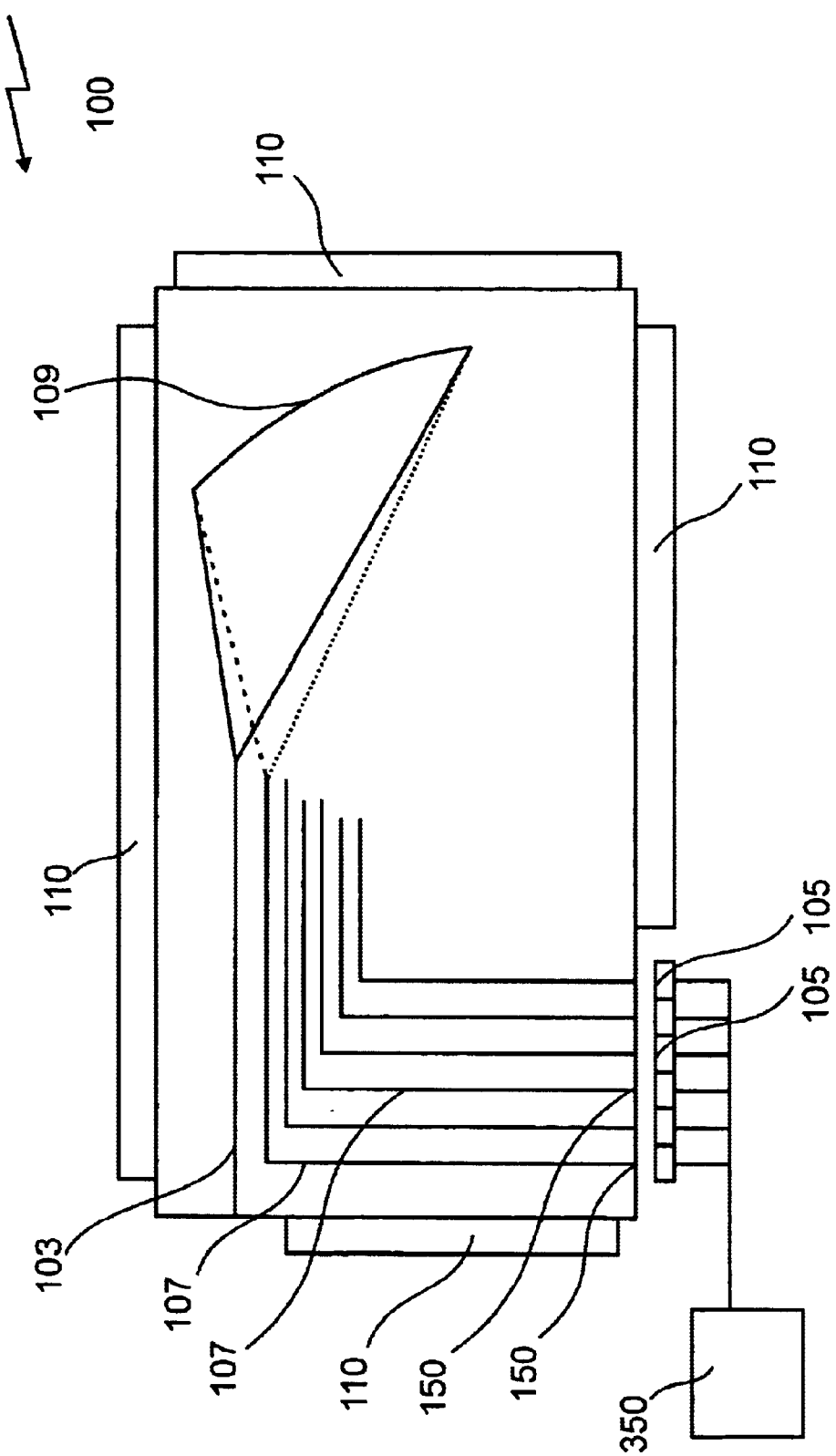
FIG. 11 is a simplified block diagram illustrating a thermally modulated optical channel monitor according to the invention.
Figure 12A:
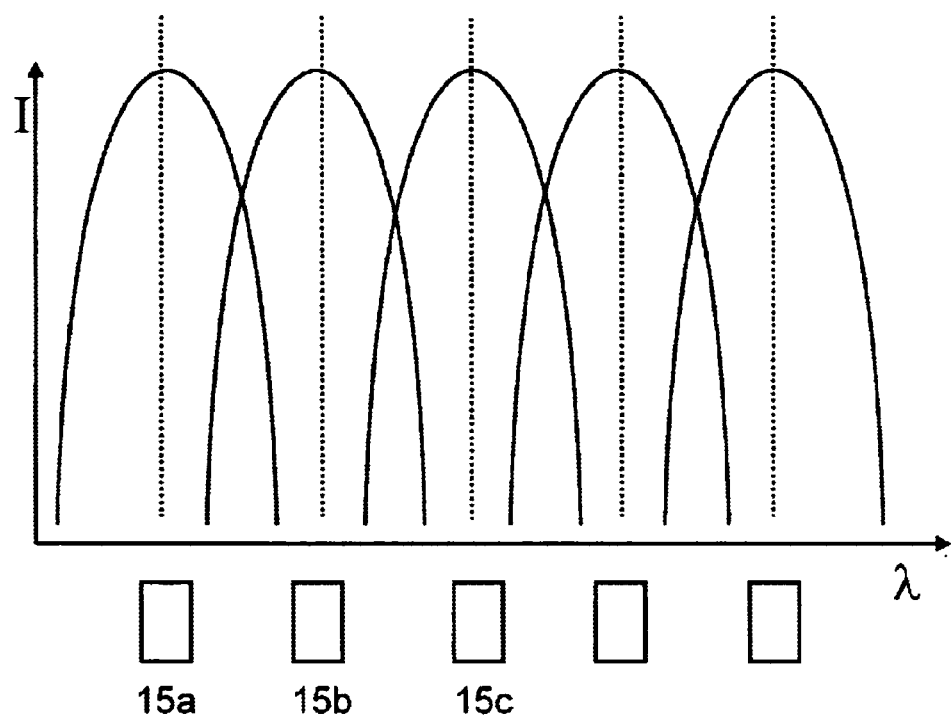
FIG. 12a is a simplified diagram illustrating the optical spectrum of a WDM optical signal.

According to yet another embodiment and referring to FIG. 11, a thermally modulated optical channel monitor (OCM) 100 in the form of a thermally modulated planar waveguide device according to the invention is shown. The OCM 100 demultiplexes an input optical signal propagating within an input waveguide 103 and provides a demultiplexed wavelength spectrum to photodetector array 105 via output waveguides 107. The incoming optical signal propagates within the planar waveguide and interacts with an angular dispersive element 109 such as an array waveguide grating or Echelle grating. The angular dispersive element 109 reflects the light off a first surface and causes separation of the light signals based upon their wavelength. The separated light signals corresponding to different channels propagate into separate output waveguides 107 optically coupled to separate output ports 150. Each output port is optically coupled to a photodetector of the photodetector array 105. The light signal within each output waveguide 107 illuminates a single photodetector of the photodetector array 105 and generates a photocurrent in dependence upon the light intensity illuminating the photodetector. Each photodetector of the photodetector array 105 is connected to a processor 350 for signal processing an output signal therefrom. The output waveguides 107 positioned relative the angular dispersive element 109 such that each output waveguide corresponds to a channel within the input optical signal. Using this form of optical monitor yields peak channel intensity for each channel as is shown in the spectrum of FIG. 12a. In the typical case of an 80 channel input optical signal, only 80 photodetectors of commercially available photodetector arrays having 128 photodetectors are used to obtain the peak intensity profile for each channel.

The wavelength detected by each photodetector of the photodetector array 105 is dependent upon the temperature of the planar waveguide device due to a temperature dependent change of the refractive index of the planar waveguide device material. This temperature dependence is used to its advantage by controllably varying the temperature using temperature adjust elements 110 in the thermally modulated OCM 100 according to the invention. Preferably, the temperature adjust elements 110 are controlled by the processor 350. For example, the position of each of the output waveguides 107 with respect to the other output waveguides 107 and with respect to the angular dispersive element 109 is chosen such that when the absolute temperature of the planar waveguide chip is T0 all output channels are accurately lined up with their correct wavelengths.

Figure 12B:
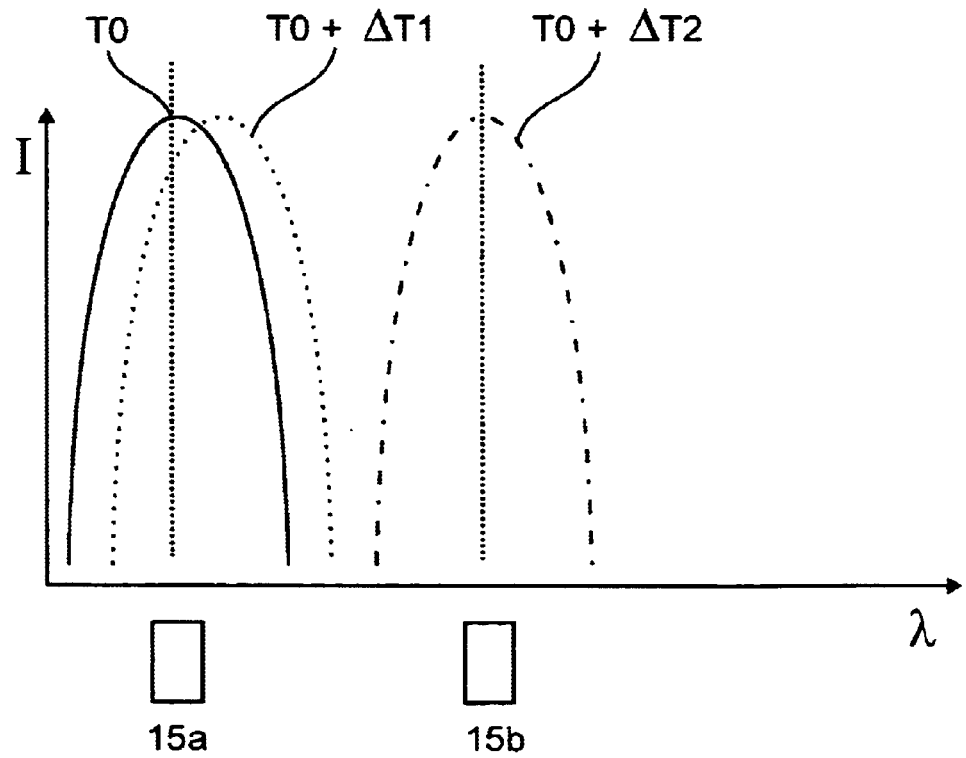
Figure 12C:
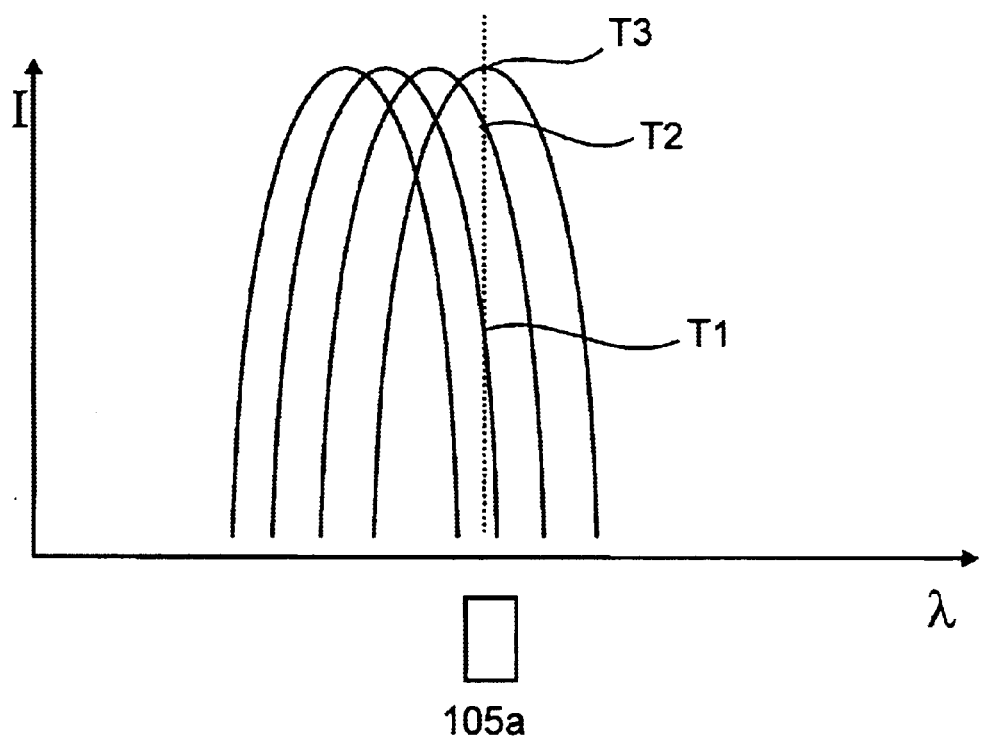
FIG. 12c is a simplified diagram illustrating the method for mapping the spectrum of a channel according to the invention using the temperature dependence of the wavelength for the channel signal shown in FIG. 12b.
Figure 12D:
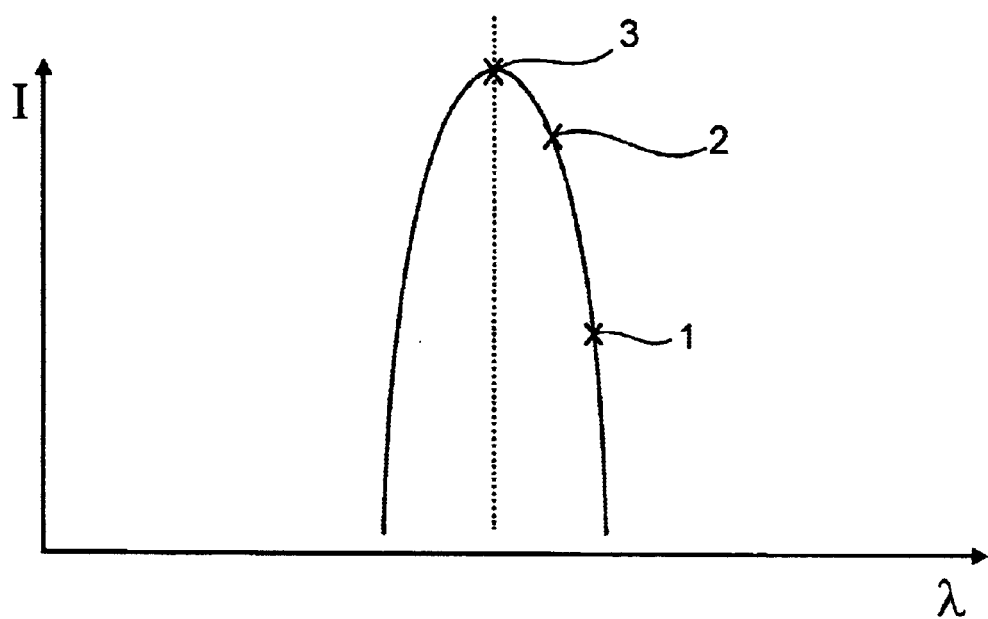
FIG. 12d is a simplified diagram illustrating sampling points of the mapped spectrum of a channel according using the method according to the invention shown in FIG. 12c.

Changing the temperature of the planar waveguide from a temperature T0 to a temperature T0+ΔT1 the wavelength of a particular channel is changed as indicated by the solid and dashed curves in FIG. 12b for the channel a. A further change of the temperature to T0+ΔT2 results in a wavelength shift such that the peak of channel is detected by photodetector 15b. Changing the temperature of, for example, an InP planar waveguide chip by 10° C. results in a change in the wavelength of a particular channel by 1 nm, which is larger than the 100 GHz channel spacing—0.8 nm—of the ITU WDM grid. Therefore, it is possible to map the spectral shape of a particular channel as shown in FIGS. 12c and 12d using one photodetector and varying the temperature—T1, T2, T3 . . . —of the planar waveguide device in order to obtain a plurality of sampling points within the channel spectrum as indicated by corresponding numerals 1, 2, 3, . . . of a particular channel. The advantage of this thermal modulation technique is that only a single photodetector is required for each channel in order to obtain accurate wavelength information to a resolution of 10 pm at 1550 nm=1,550,000 pm, i. e. one part in about 155,000.

Such accurate spectral information is highly advantageous for accurately determining peak intensity and peak wavelength of a channel in modern WDM optical communication networks. Using this technique, it is possible to accurately map the spectral shape of a particular channel using one photodetector by varying the temperature of an integrated InP planar waveguide chip by less than 10° C. As is evident to a person of skill in the art the technique according to the invention is also applicable if more than one photodector per channel is available. Having more than one photodetector per channel allows, for example, mapping of a channel spectrum with higher resolution within a same time interval or reducing the time interval for mapping the channel spectrum with a same resolution.

Figure 13A:
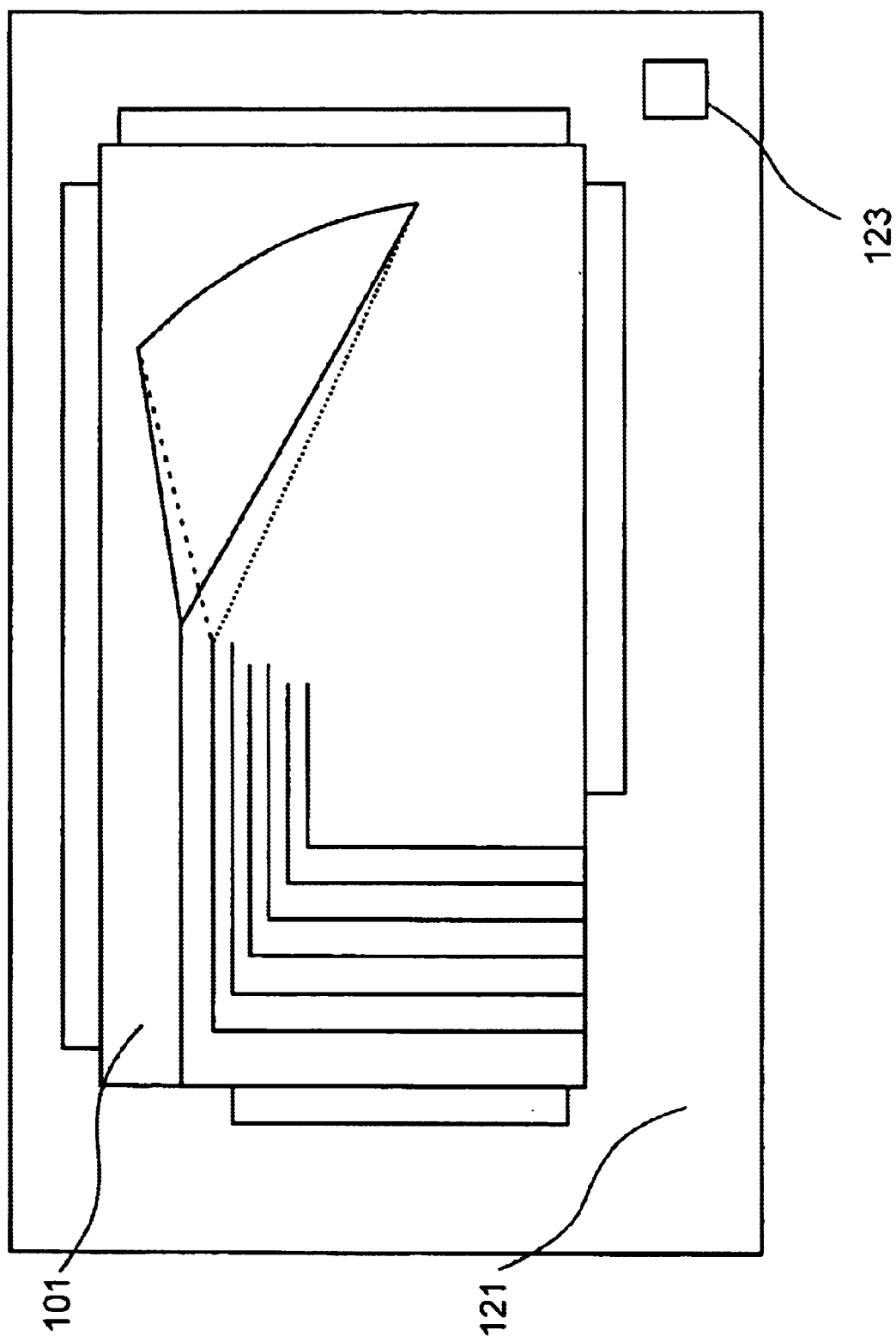
FIG. 13a is a simplified block diagram illustrating a thermally modulated optical channel monitor according to the invention; and, FIG. 13b is a simplified block diagram illustrating a thermally modulated optical channel monitor according to the invention.
Figure 13B:
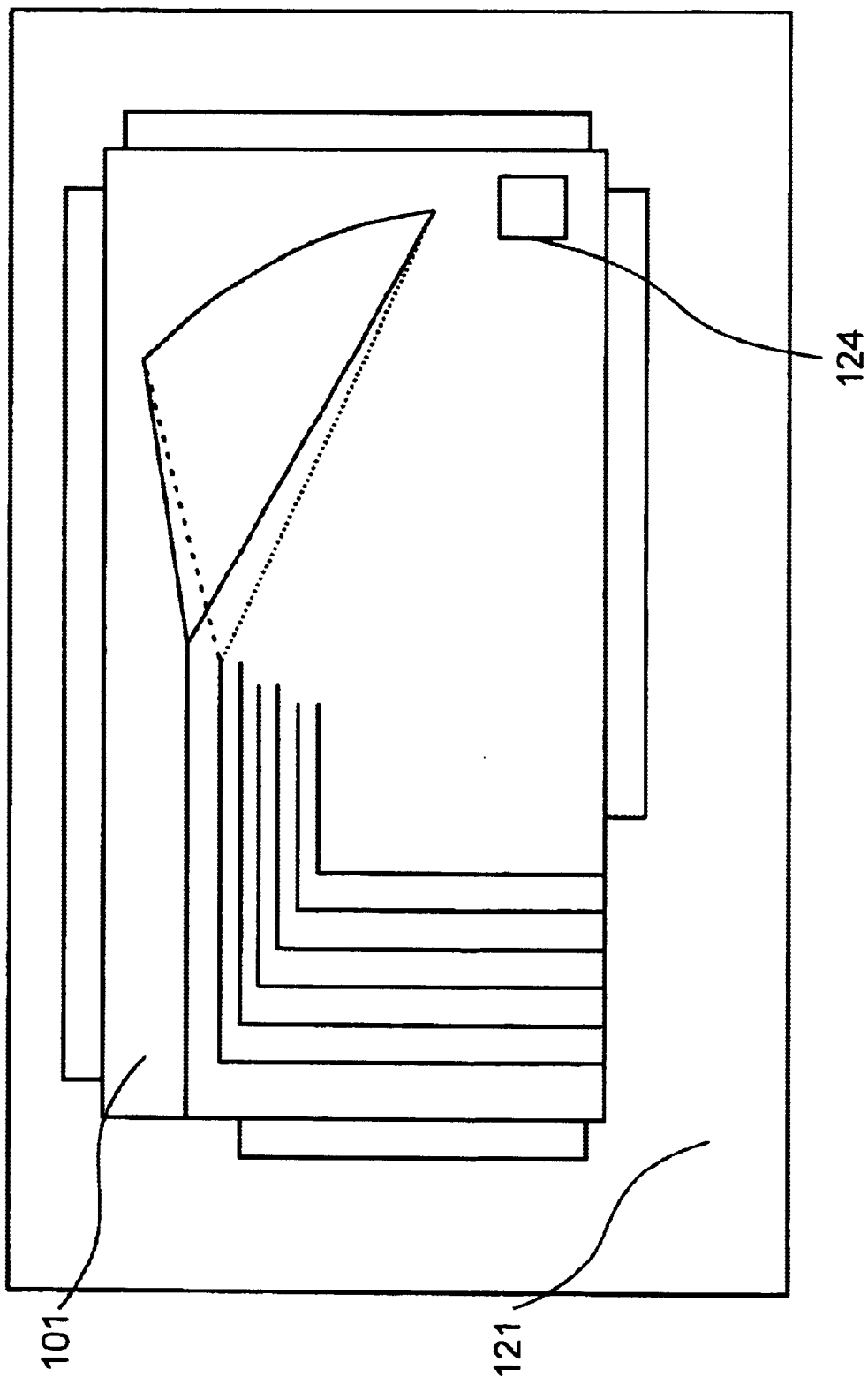

One solution for determining the temperature is shown in FIG. 13a. Here, a temperature sensor 123 for monitoring a temperature is embedded in a carrier 121 the planar waveguide chip 101 is mounted on. However, due to thermal resistance it is difficult to determine the absolute temperature of the planar waveguide chip 101 by measuring a temperature with sensor 123. Furthermore, the time delay between an instance of a temperature change of the planar waveguide chip and an instance of a resulting temperature change sensed by sensor 123 makes it next to impossible to accurately map the spectral shape of a channel by varying the temperature of the planar waveguide chip 101. An improvement of the temperature measurement is obtained by embedding a temperature sensor 124 directly into the planar waveguide chip, as shown in FIG. 13b. Here, the time delay is reduced by shortening the distance between the actual optical component—waveguides and grating—and the temperature sensor 124 and by obviating the interface between the planar waveguide chip 101 and the carrier 121.

Of course, though the above examples refer to echelle gratings, other forms of dispersive elements such as array waveguide gratings are also employable with the present invention. Preferably, these other dispersive elements are integrated, allowing the various optical components to be provided on the same substrate. This integration will reduce costs and enhance the quality of the finished device.

Numerous other embodiments may be envisioned without departing from the spirit or scope of the invention.

What is claimed is:

1. A waveguide optical monitor comprising:
   a plurality of dispersive element input ports;
   a plurality of photodetectors for sensing an intensity of light incident thereon; and
   a dispersive element integrated on a single substrate, the dispersive element for receiving light from any one of the dispersive element input ports and for dispersing the light toward the plurality of photodetectors in dependence upon a position of said dispersive element input port and a wavelength of the light such that light directed from a first of the plurality of dispersive element input ports toward the plurality photodetectors has associated first centre wavelengths and light directed from the second of the plurality of dispersive element input ports toward the plurality of photodetectors has associated second centre wavelengths, the second centre wavelengths each substantially different from all of the first centre wavelengths.

2. A waveguide optical monitor according to claim 1, comprising:
   a plurality of input waveguides optically coupled with the dispersive element input ports for guiding light to the dispersive element input ports.

3. A waveguide optical monitor according to claim 1, comprising:
   a plurality of output waveguides optically coupled between the dispersive element and the plurality of photodetectors.

4. A waveguide optical monitor according to claim 1, comprising:
   a monitor input part for receiving an optical signal to be monitored;
   an optical switch in optical communication with the monitor input part and for selectably switching an optical signal received at the monitor input port to any one of the plurality of dispersive element input ports.

5. A waveguide optical monitor according to claim 4, wherein directed from a first of the plurality of dispersive element input ports toward the plurality photodetectors has associated a first set of wavelength channels, the first set of wavelength channels having a characteristic channel spacing and, the first and second centre wavelengths differ by a fraction of the characteristic channel spacing.

6. A waveguide optical monitor according to claim 5, wherein the fraction is one half and wherein the plurality of dispersive element input ports consists of two dispersive element input ports.

7. A waveguide optical monitor according to claim 5, wherein the fraction is one third and wherein the plurality of dispersive element input ports consists of three dispersive element input ports.

8. A waveguide optical monitor according to claim 5, wherein the fraction is one quarter and wherein the plurality of dispersive element input ports consists of four dispersive element input ports.

9. A waveguide optical monitor according to claim 4, wherein the waveguide optical monitor is integrated on a single substrate.

10. A waveguide optical monitor according to claim 1, wherein the waveguide optical monitor is integrated on a single substrate.

11. A waveguide optical monitor comprising:
an optical input port;
a plurality of dispersive element input ports;
an optical switch in optical communication with the optical input port and for switching light received at the optical input port to one of the plurality of dispersive element input ports;
a plurality of photodetectors for sensing an intensity of light incident thereon;
a dispersive element integrated on a single substrate the dispersive element for receiving light from any one of the dispersive element input ports and for dispersing the light toward the plurality of photodetectors in dependence upon a position of said dispersive element input port and a wavelength of the light such that light directed from a first of the plurality of dispersive element input ports toward the plurality of photodetectors has associated first centre wavelengths and light directed from the second of the plurality of dispersive element input ports toward the plurality of photodetectors has associated second centre wavelengths, the second centre wavelengths forming a set different from a set formed by the first centre wavelengths.

12. A waveguide optical monitor according to claim 11, comprising:
a plurality of input waveguides optically coupled with the dispersive element input ports for guiding light to the dispersive element input ports.

13. A waveguide optical monitor according to claim 11, comprising:
a plurality of output waveguides optically coupled between the dispersive element and the plurality of photodetectors.

14. A waveguide optical monitor according to claim 11, wherein light directed from a first of the plurality of dispersive element input ports toward the plurality photodetectors has associated a first of wavelength channels, the first set of wavelength channels having a characteristic channel spacing and, the first and second centre wavelengths differ by a fraction of a the characteristic channel spacing.

15. A waveguide optical monitor according to claim 14, wherein the fraction is one half and wherein the plurality of dispersive element input ports consists of two dispersive element input ports.

16. A waveguide optical monitor according to claim 14, wherein the fraction is one third and wherein the plurality of dispersive element input ports consists of three dispersive element input ports.

17. A waveguide optical monitor according to claim 11, wherein the waveguide optical monitor is integrated on a single substrate.

18. A method of monitoring a wavelength division multiplexed optical signal comprising the steps of:
providing an optical signal to a switch;
selecting a switch mode for selectably providing the optical signal via one of a plurality of input ports to a dispersive element;
propagating the optical signal from the switch to a dispersive optical element via an optical waveguide:
dispersing the optical signal in dependence upon the location of the selected input port and in dependence upon a wavelength of the optical signal and directing the dispersed optical signal toward a plurality of monitoring elements,
wherein selecting different switching modes results in light within a different wavelength range being incident upon a same detector.

19. A method according to claim 18, wherein the wavelength range and the different wavelength range are within a range of a single wavelength channel.

* * * * *